US012146333B1

(12) United States Patent
Ko et al.

(10) Patent No.: US 12,146,333 B1
(45) Date of Patent: Nov. 19, 2024

(54) FLAGPOLE LIGHT MOUNTING SYSTEM

(71) Applicants: Donald Ko, Phillips Ranch, CA (US); Gordon Ko, Phillips Ranch, CA (US)

(72) Inventors: Donald Ko, Phillips Ranch, CA (US); Gordon Ko, Phillips Ranch, CA (US)

( * ) Notice: Subject to any disclaimer, the term of this patent is extended or adjusted under 35 U.S.C. 154(b) by 0 days.

(21) Appl. No.: 18/242,885

(22) Filed: Sep. 6, 2023

(51) Int. Cl.
*E04H 12/32* (2006.01)
*F21V 21/116* (2006.01)

(52) U.S. Cl.
CPC ............ *E04H 12/32* (2013.01); *F21V 21/116* (2013.01)

(58) Field of Classification Search
CPC ............................... F21V 21/116; E04H 12/32
See application file for complete search history.

(56) References Cited

U.S. PATENT DOCUMENTS 8,057,078 B1 * 11/2011 Ko .......................... G09F 23/04 362/253
2005/0072057 A1 * 4/2005 Ciaccia ................... E04H 12/32 52/40
2005/0083693 A1 * 4/2005 Garrett .................... G09F 17/00 362/276
2016/0348863 A1 * 12/2016 Toner ...................... G09F 17/00
2017/0152998 A1 * 6/2017 Toner ...................... F21S 9/032

* cited by examiner

*Primary Examiner* — Julie A Bannan

(74) *Attorney, Agent, or Firm* — Camuti Law Group, APC; Nathan Camuti

(57) ABSTRACT

The flagpole light mounting system may comprise a flagpole extension, a light unit, and a bracket. The flagpole light mounting system may detachably couple to a non-vertical flagpole to illuminate from above a flag being flown from the non-vertical flagpole. The flagpole extension may be inserted between the non-vertical flagpole and an ornamental top. The top of the bracket may couple to the light unit and the bottom of the bracket may couple to the flagpole extension via an anti-rotation coupling. The shape of the bracket and the positioning of twin light sources located within the light unit may cause both sides of the flag to be illuminated. As non-limiting examples, the non-vertical flagpole may be mounted horizontally or at an oblique upward angle relative to a supporting structure.

18 Claims, 12 Drawing Sheets

FLAGPOLE LIGHT MOUNTING SYSTEM

BACKGROUND

The United States Flag Code (4 USC Ch. 1 § 6. (a)) states: "It is the universal custom to display the flag only from sunrise to sunset on buildings and on stationary flag staffs in the open. However, when a patriotic effect is desired, the flag may be displayed twenty-four hours a day if properly illuminated during the hours of darkness."

Illumination for a U.S. flag displayed on a vertically-standing flagpole is typically accomplished using spotlights mounted on the ground surrounding the flagpole. Because the wind may blow the flag in any direction and because of the distance between the flag and the ground, the spotlights may be configured to brightly illuminate a large portion of the sky and may contribute greatly to light pollution. The spotlights may also be relatively expensive to acquire and operate.

Non-vertically mounted flagpoles create a different set of illumination challenges and may provide an opportunity for a lower-cost and less light-polluting way to illuminate the flag.

SUMMARY

The present disclosure is directed to systems and methods for a flagpole light mounting system, substantially as shown in and/or described in connection with at least one of the figures, as set forth more completely in the claims. The flagpole light mounting system may comprise a flagpole extension, a light unit, and a bracket. The flagpole light mounting system may detachably couple to a non-vertical flagpole to illuminate from above a flag being flown from the non-vertical flagpole. The flagpole extension may be inserted between the non-vertical flagpole and an ornamental top. The top of the bracket may couple to the light unit and the bottom of the bracket may couple to the flagpole extension via an anti-rotation coupling. The shape of the bracket and the positioning of twin light sources located within the light unit may cause both sides of the flag to be illuminated. As non-limiting examples, the non-vertical flagpole may be mounted horizontally or at an oblique upward angle relative to a supporting structure.

DETAILED DESCRIPTION

Figure 1:
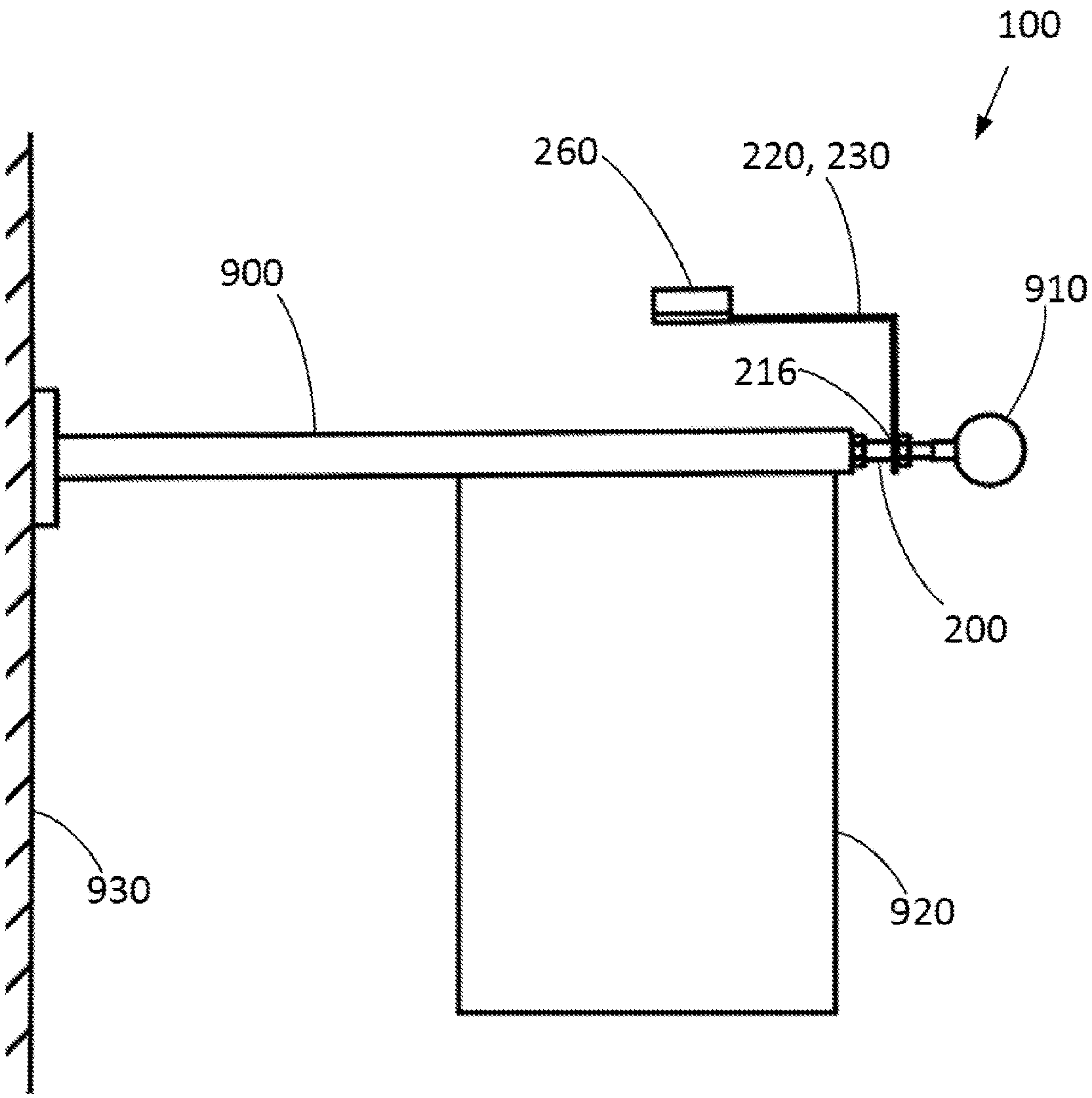
FIG. 1 shows a side view of an exemplary flagpole light mounting system, according to one embodiment of the present disclosure, illustrating a horizontally-mounted flagpole.
Figure 2:
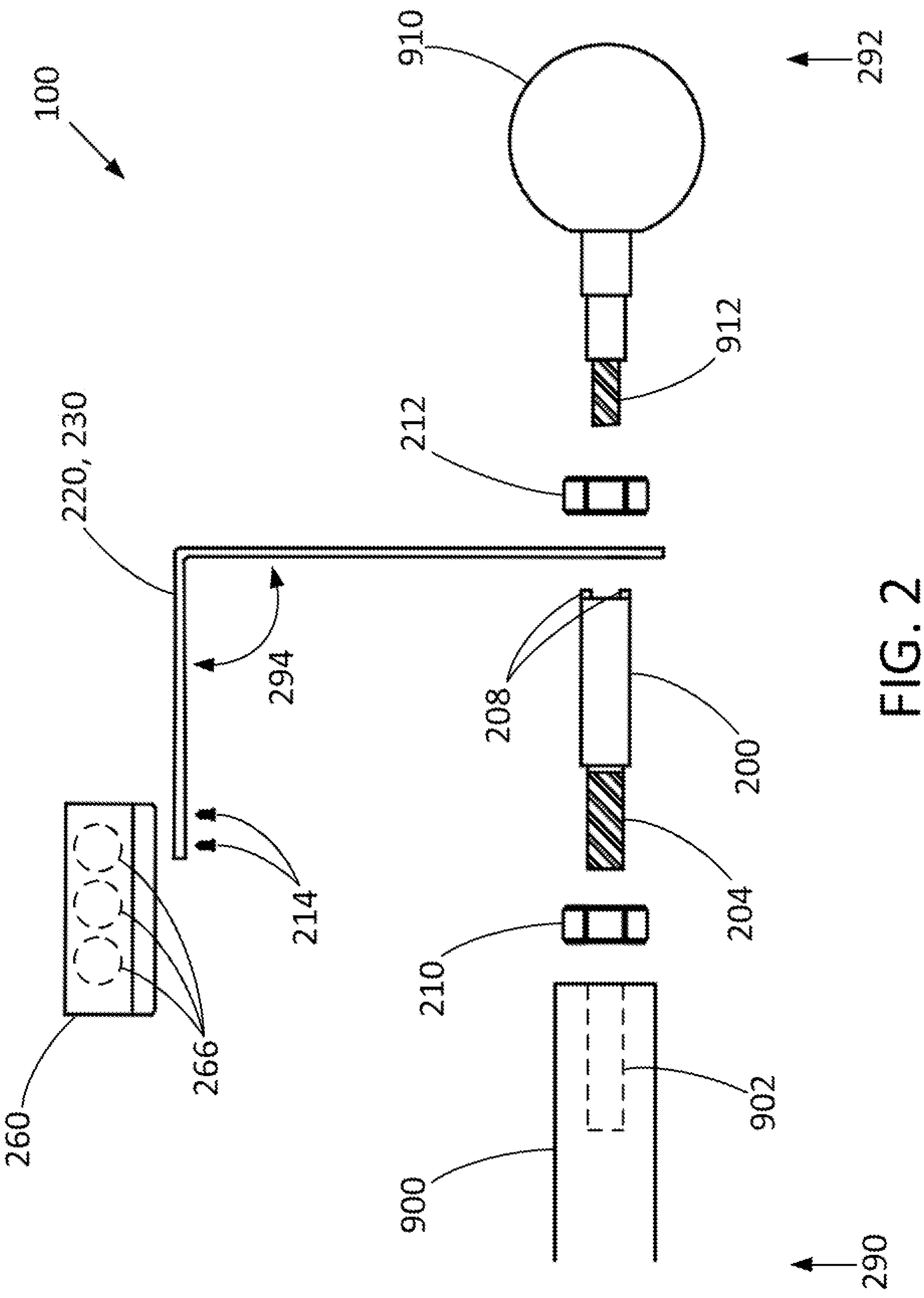
FIG. 2 shows an exploded view of the flagpole light mounting system, according to one embodiment of the present disclosure, illustrating a horizontally-mounted flagpole.
Figure 3:
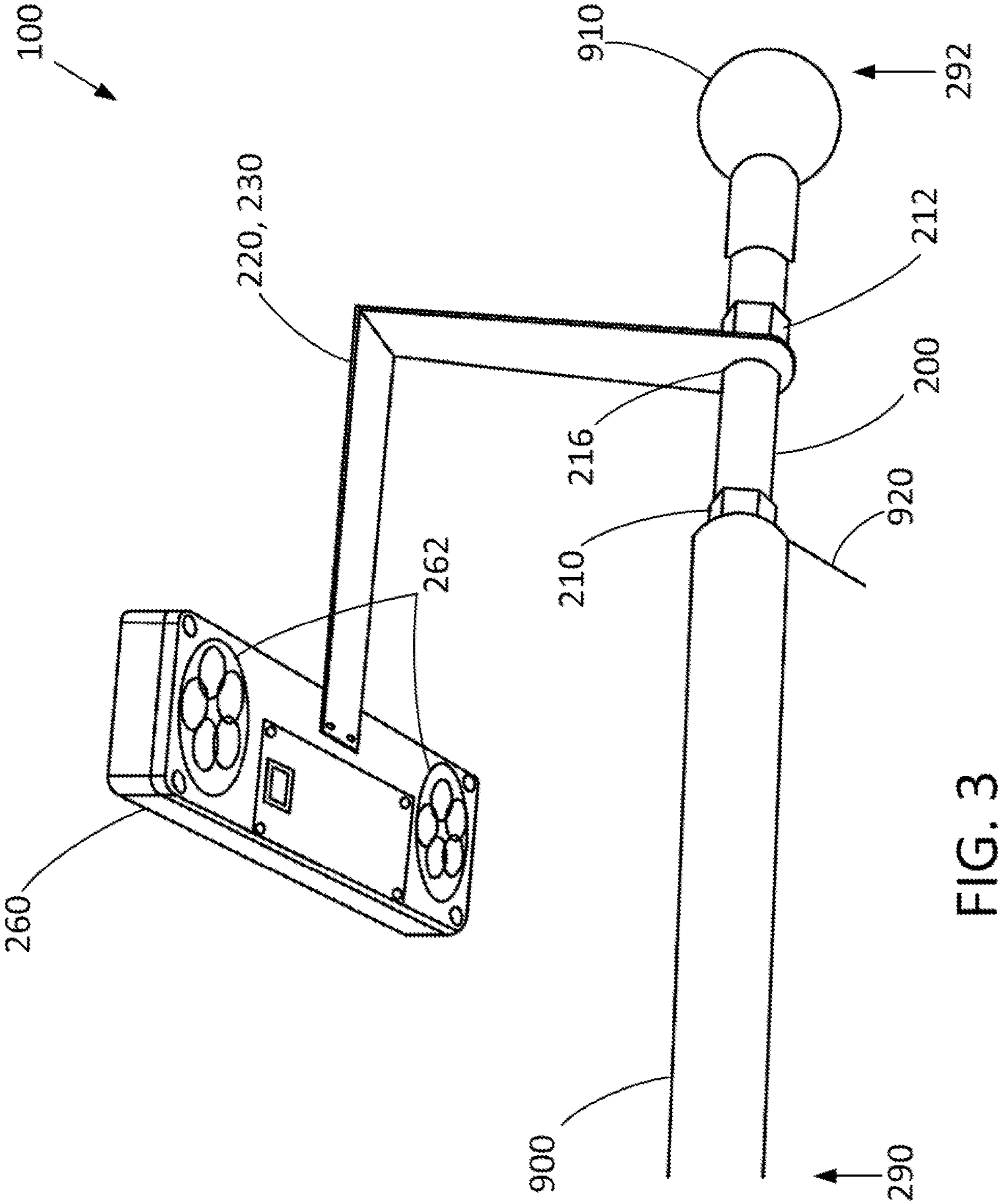
FIG. 3 shows an isometric view of the flagpole light mounting system, according to one embodiment of the present disclosure, illustrating a horizontally-mounted flagpole.
Figure 6:
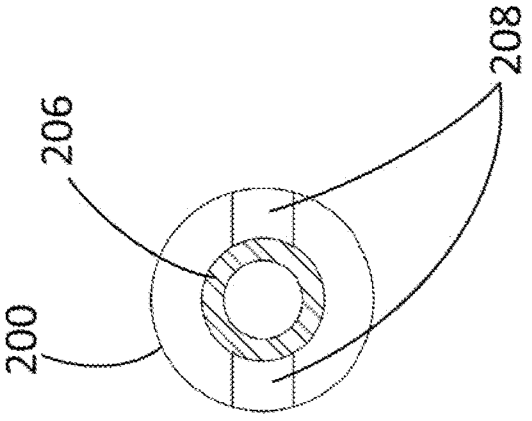
FIG. 6 shows a distal end view of the flagpole light mounting system, according to one embodiment of the present disclosure, illustrating a flagpole extension.
Figure 5:
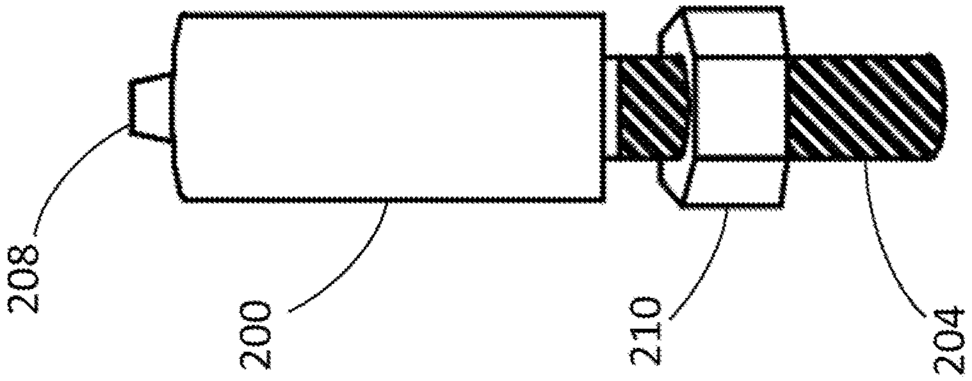
FIG. 5 shows another side view of the flagpole light mounting system, according to one embodiment of the present disclosure, illustrating a flagpole extension.
Figure 4:
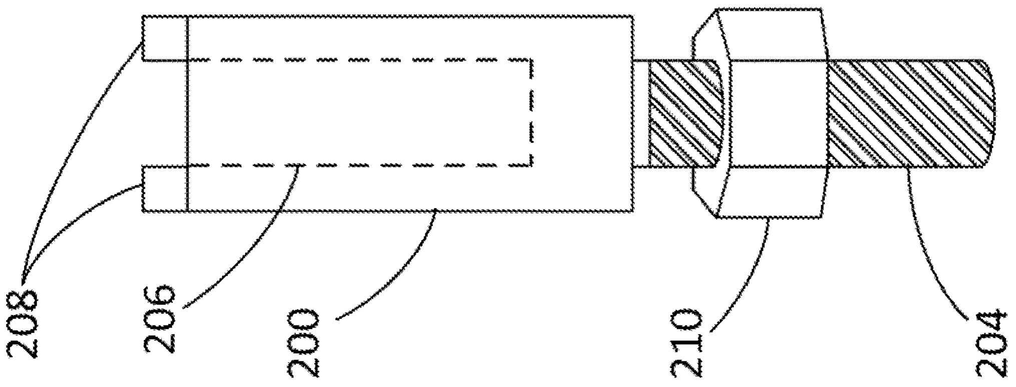
FIG. 4 shows a side view of the flagpole light mounting system, according to one embodiment of the present disclosure, illustrating a flagpole extension.
Figure 7:
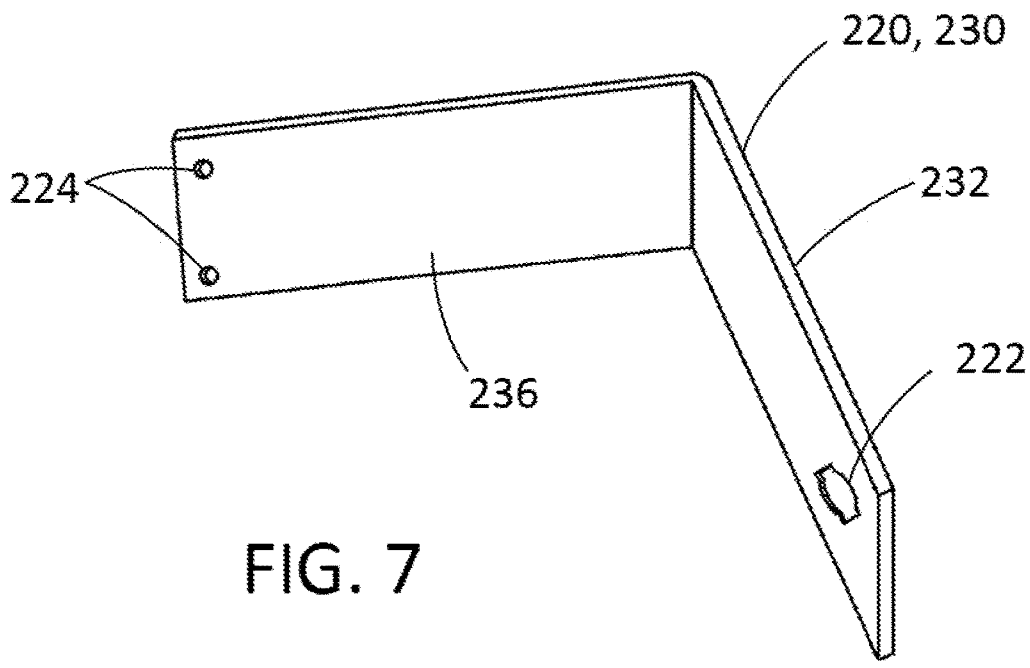
FIG. 7 shows an isometric view of the flagpole light mounting system, according to one embodiment of the present disclosure, illustrating a first bracket.
Figure 8:
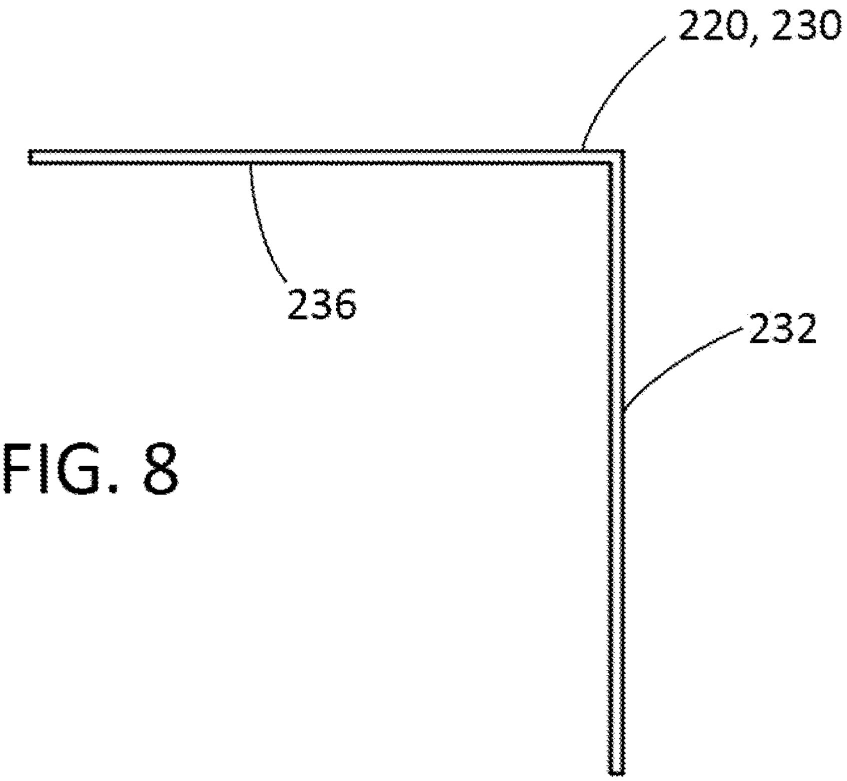
FIG. 8 shows a side view of the flagpole light mounting system, according to one embodiment of the present disclosure, illustrating a first bracket.
Figure 9:
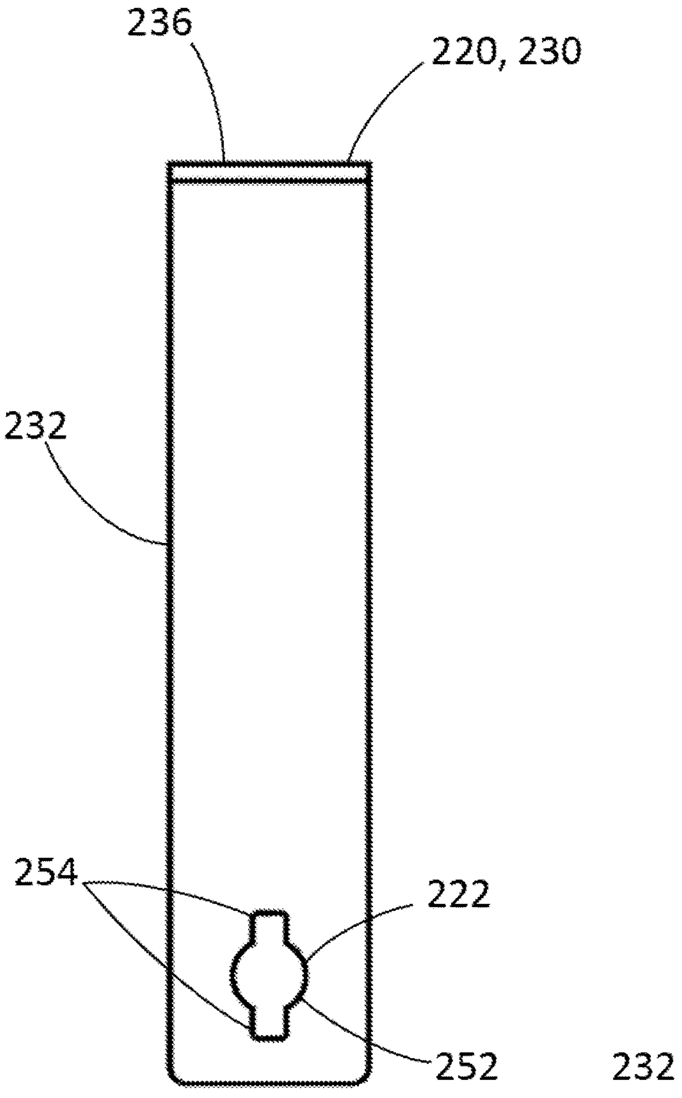
FIG. 9 shows a front view of the flagpole light mounting system, according to one embodiment of the present disclosure, illustrating a first bracket.
Figure 10:
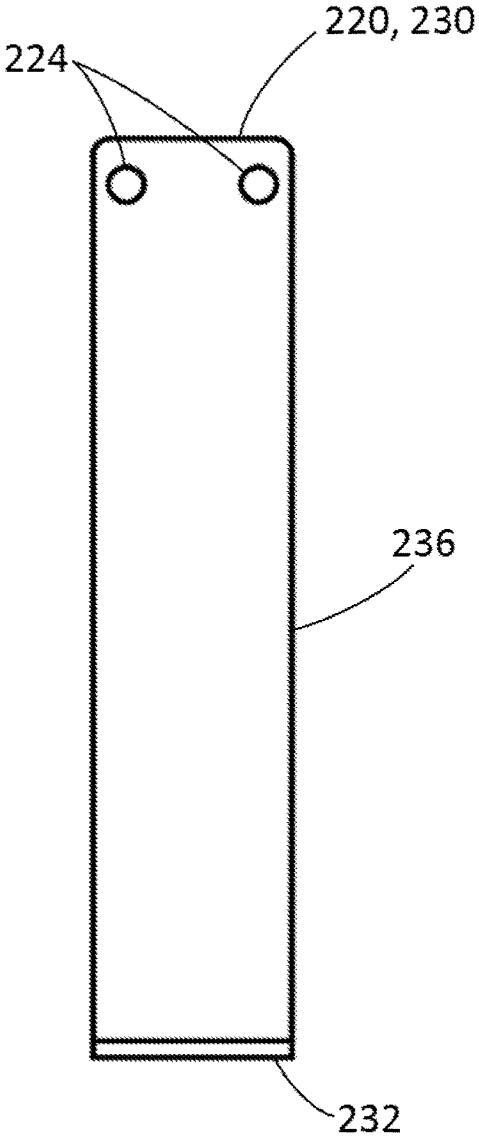
FIG. 10 shows a bottom view of the flagpole light mounting system, according to one embodiment of the present disclosure, illustrating a first bracket.
Figure 11:
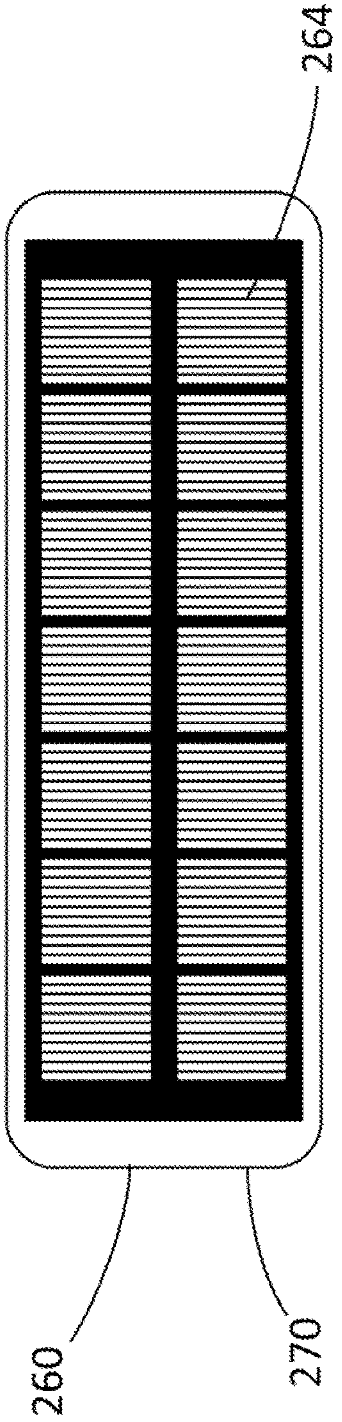
FIG. 11 shows a top view of the flagpole light mounting system, according to one embodiment of the present disclosure, illustrating the light unit.
Figure 12:
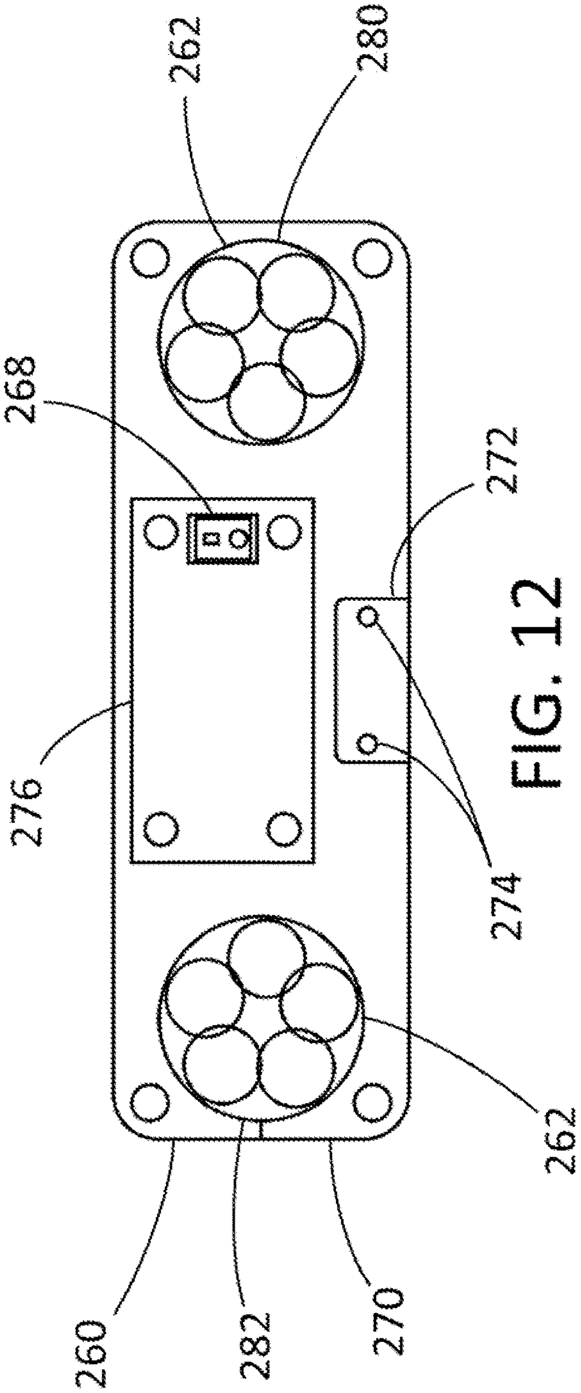
FIG. 12 shows a bottom view of the flagpole light mounting system, according to one embodiment of the present disclosure, illustrating the light unit.
Figure 13:
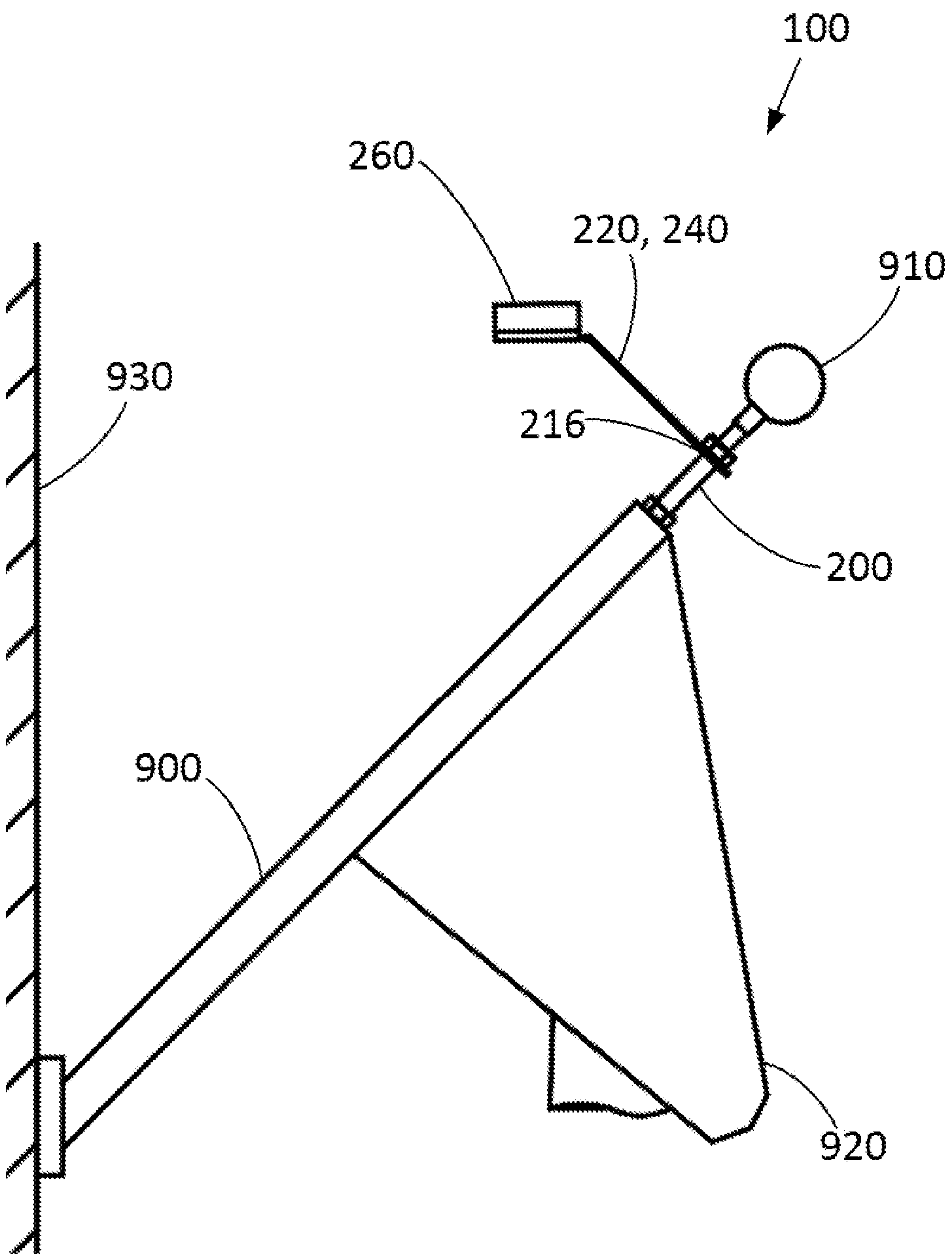
FIG. 13 shows a side view of an exemplary flagpole light mounting system, according to one embodiment of the present disclosure, illustrating an obliquely-mounted flagpole.
Figure 14:
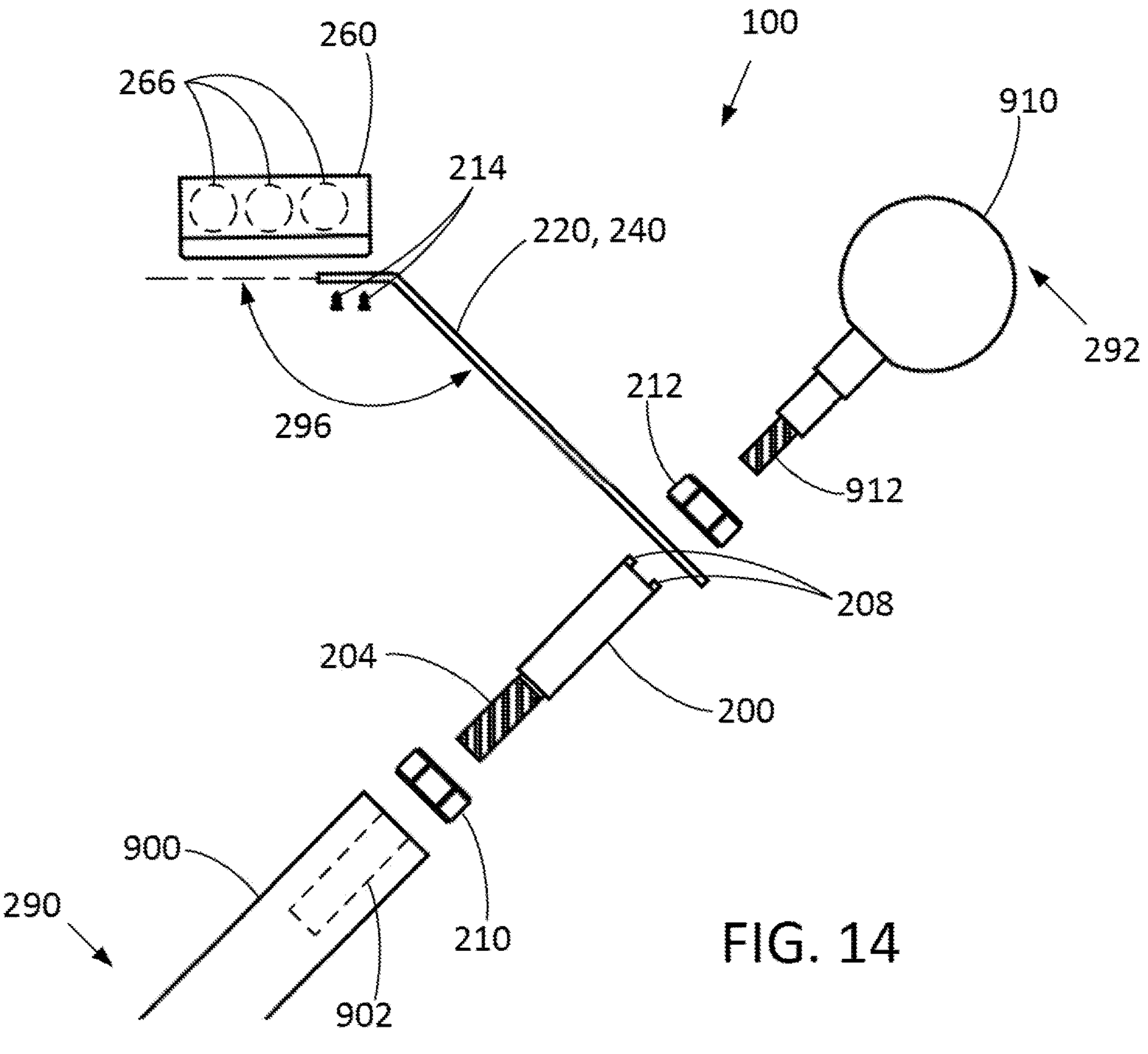
FIG. 14 shows an exploded view of the flagpole light mounting system, according to one embodiment of the present disclosure, illustrating an obliquely-mounted flagpole.
Figure 15:
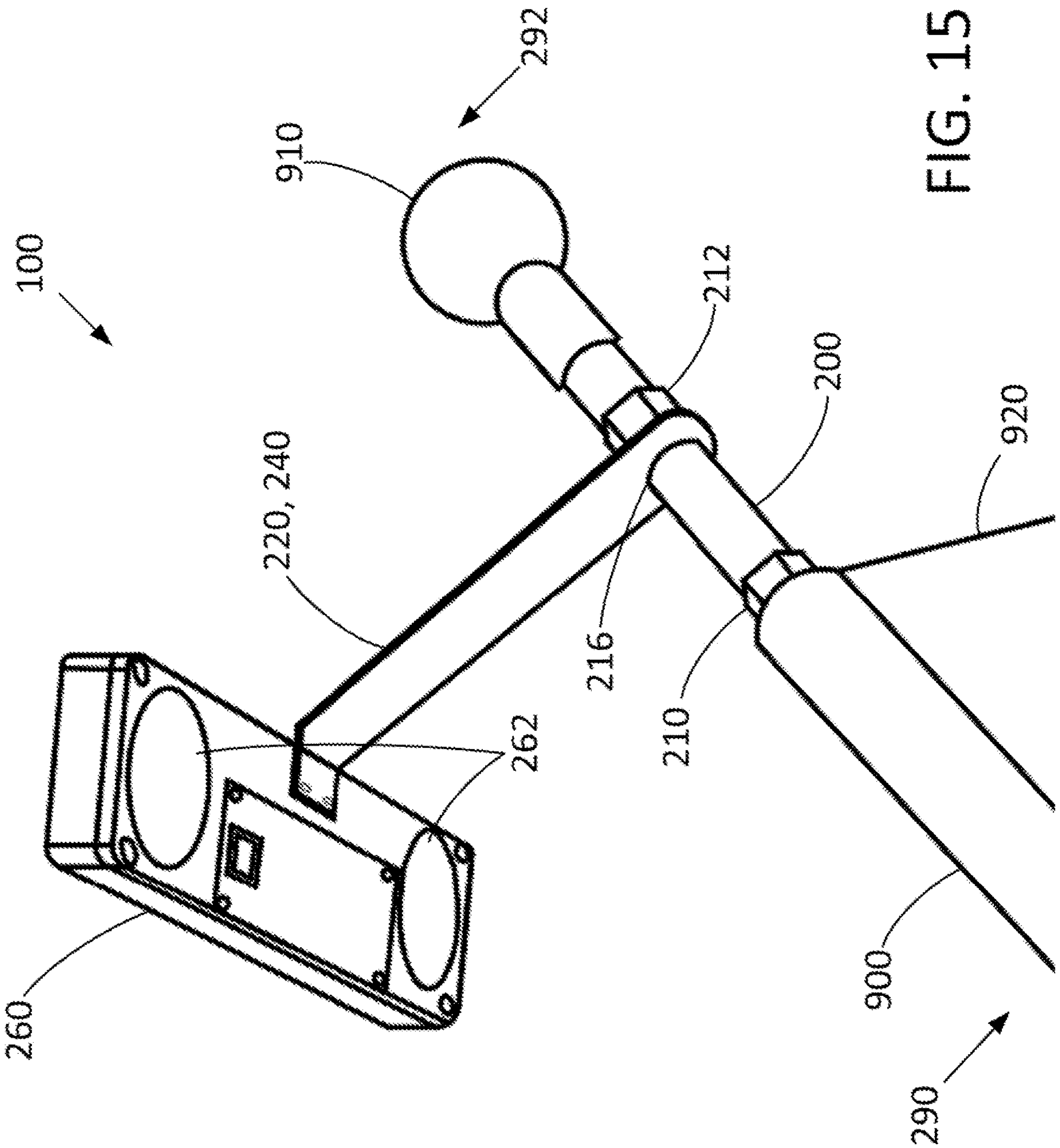
FIG. 15 shows an isometric view of the flagpole light mounting system, according to one embodiment of the present disclosure, illustrating an obliquely-mounted flagpole.
Figure 16:
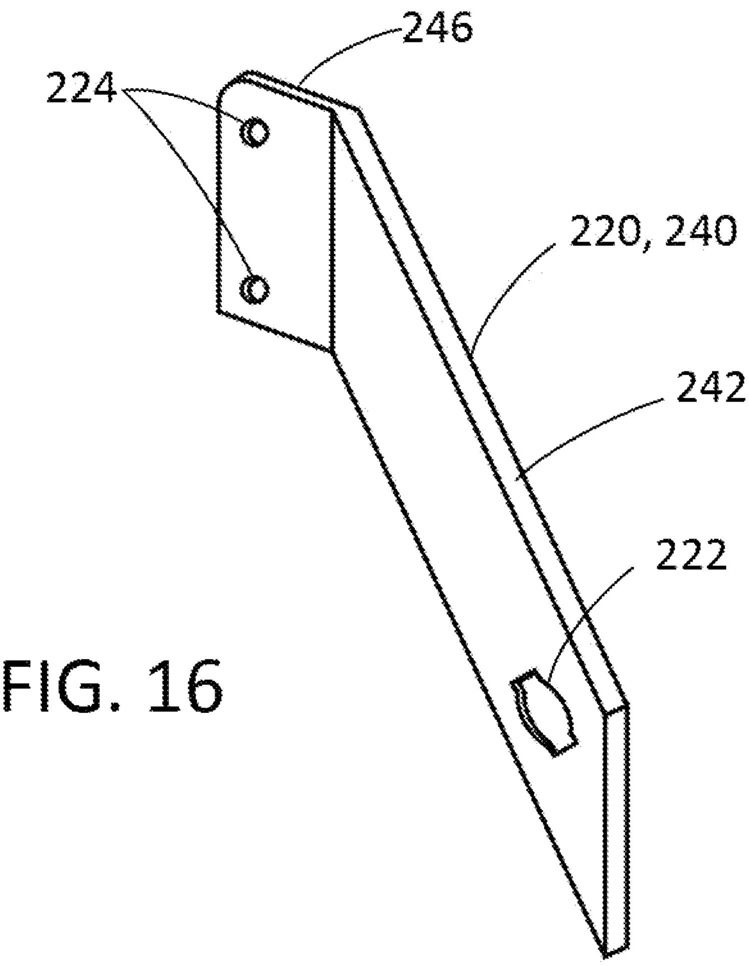
FIG. 16 shows an isometric view of the flagpole light mounting system, according to one embodiment of the present disclosure, illustrating a second bracket.
Figure 17:
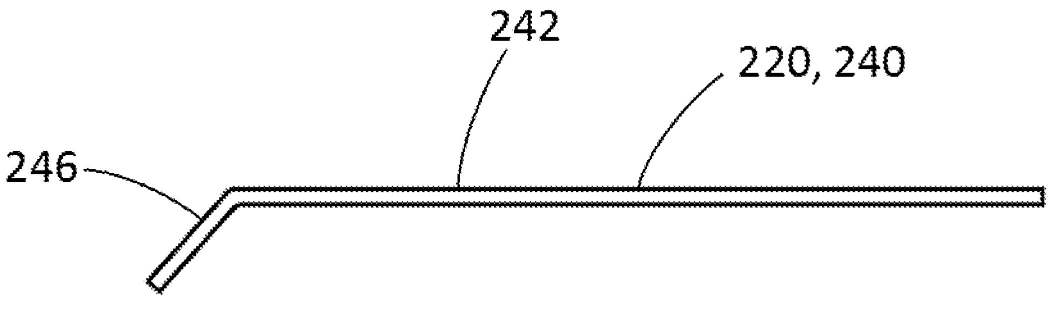
FIG. 17 shows a side view of the flagpole light mounting system, according to one embodiment of the present disclosure, illustrating a second bracket.
Figure 19:
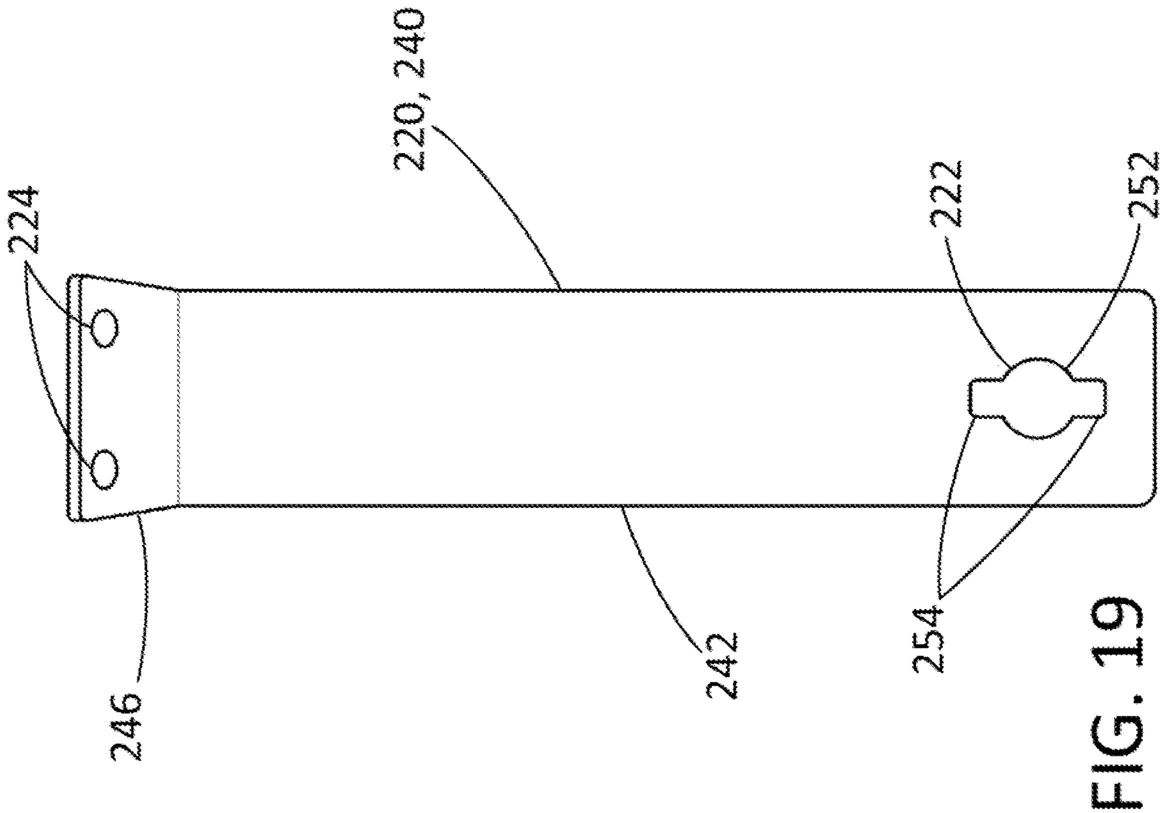
FIG. 19 shows a front view of the flagpole light mounting system, according to one embodiment of the present disclosure, illustrating a second bracket.
Figure 18:
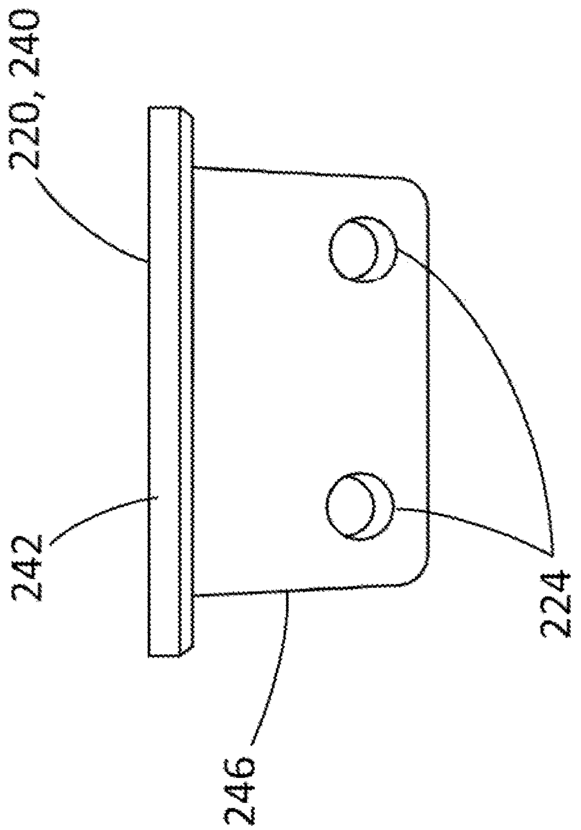
FIG. 18 shows a bottom view of the flagpole light mounting system, according to one embodiment of the present disclosure, illustrating a second bracket.

The following description contains specific information pertaining to embodiments in the present disclosure. The drawings in the present application and their accompanying detailed description are directed to merely exemplary embodiments. Unless noted otherwise, like or corresponding elements among the figures may be indicated by like or corresponding reference numerals. Moreover, the drawings and illustrations in the present application are generally not to scale and are not intended to correspond to actual relative dimensions.

Flagpole light mounting system 100 may comprise flagpole extension 200, light unit 260, and bracket 220. System 100 may detachably couple to non-vertical flagpole 900 to illuminate flag 920 from above when flag 920 being flown from non-vertical flagpole 900. Flagpole extension 200 may be inserted between non-vertical flagpole 900 and ornamental top 910. The top of bracket 220 may couple to light unit 260. The bottom of bracket 220 may couple to flagpole extension 200 via anti-rotation coupling 216. The shape of bracket 220 and the positioning of twin light sources 262 located within light unit 260 may cause both sides of flag 920 to be illuminated. As non-limiting examples, non-vertical flagpole 900 may be mounted horizontally or at an oblique upward angle relative to a supporting structure 930.

The flagpole extension 200 may be a cylindrical bar that lengthens non-vertical flagpole 900. Proximal end 290 of flagpole extension 200 may comprise an externally threaded shaft 204. Flagpole extension 200 may couple to non-vertical flagpole 900 by screwing externally threaded shaft 204 of flagpole extension 200 into an internally threaded flagpole aperture 902 located at distal end 292 of non-vertical flagpole 900. Distal end 292 of flagpole extension 200 may comprise an internally threaded aperture 206. Ornamental top 910 may couple to flagpole extension 200 by screwing an externally threaded ornament shaft 912 of ornamental top 910 into internally threaded aperture 206 of flagpole extension 200.

The distal end 292 of flagpole extension 200 may further comprise two or more anti-rotation projections 208 that may be located adjacent to internally threaded aperture 206. The two or more anti-rotation projections 208 may project axially towards ornamental top 910. The two or more anti-rotation projections 208 may engage an anti-rotation aperture 222 located at the bottom of bracket 220 in order to prevent bracket 220 from rotating around flagpole extension 200. The two or more anti-rotation projections 208 on flagpole extension 200 and anti-rotation aperture 222 on bracket 220 may comprise anti-rotation coupling 216. In a preferred embodiment, the two or more anti-rotation projections 208 may comprise two projections.

A first fastener 210 and a second fastener 212 may be operable to further prevent rotation of flagpole extension 200 and bracket 220. First fastener 210 may thread onto externally threaded shaft 204 of flagpole extension 200 before coupling flagpole extension 200 to non-vertical flagpole 900. First fastener 210 may be rotated to tighten against non-vertical flagpole 900 to prevent flagpole extension 200 from rotating. As a non-limiting example, first fastener 210 may be a locknut. Second fastener 212 may thread onto externally threaded ornament shaft 912 of ornamental top 910 before coupling ornamental top 910 to flagpole extension 200. Second fastener 212 may be rotated to tighten against flagpole extension 200 to assure that anti-rotation aperture 222 on bracket 220 remains engaged with the two or more anti-rotation projections 208 on flagpole extension 200.

The light unit 260 may illuminate flag 920 after dusk. Light unit 260 may be positioned above flag 920 and supported by bracket 220. The intensity of twin light sources 262, the size of bracket 220, and the shape of bracket 220 may cause light unit 260 to illuminate the entirety of flag 920.

The twin light sources 262 may comprise a left light source 280 that is positioned on the bottom left side of light unit enclosure 270 and a right light source 282 that is positioned on the bottom right side of light unit enclosure 270. In some embodiments, left light source 280 and right light source 282 may be canted to point towards the center of flag 920.

In some embodiments, an individual light source selected from left light source 280 and right light source 282 may comprise one or more light emitting diodes.

The light unit 260 may be solar-powered. A solar panel 264 located on the top of light unit enclosure 270 may charge one or more rechargeable batteries 266 during daylight hours. One or more rechargeable batteries 266 may power twin light sources 262 between dusk and dawn. The one or more rechargeable batteries 266 may be accessible for servicing via a battery door 276. An ON/OFF switch 268 accessible outside of light unit enclosure 270 may interrupt the electrical circuit between the one or more rechargeable batteries 266 and twin light sources 262 to prevent twin light sources 262 from drawing power from the one or more rechargeable batteries 266 during periods of disuse.

The light unit enclosure 270 may comprise a mounting inset 272 for accepting distal end 292 of bracket 220. Bracket 220 may couple to light unit 260 by passing mounting hardware 214 through a plurality of bracket mounting apertures 224 in bracket 220 and into a plurality of enclosure mounting apertures 274 located in mounting inset 272.

Bracket 220 may be an armature that supports light unit 260 at a position above flag 920 such that light unit 260 is centered over non-vertical flagpole 900 and at a height that optimally illuminates both sides of flag 920. Bracket 220 may be selected from a first bracket 230 for use on horizontal flagpoles and a second bracket 240 for use on obliquely-angled flagpoles.

The first bracket 230 may comprise a vertical arm 232 and a horizontal arm 236. The angle formed by vertical arm 232 and horizontal arm 236 may be a perpendicular angle 294. Vertical arm 232 may couple to flagpole extension 200 via anti-rotation aperture 222. Horizontal arm 236 may couple to light unit 260 via the plurality of bracket mounting apertures 224. When coupled to a horizontal flagpole, first bracket 230 may position light unit 260 directly over flag 920 at a height that illuminates the entirety of flag 920. First bracket 230 may orient light unit 260 such that solar panel 264 is parallel to the ground for optimum sun exposure throughout the day.

The second bracket 240 may comprise a riser arm 242 and a light unit arm 246. The angle formed by riser arm 242 and light unit arm 246 may be an oblique angle 296. Riser arm 242 may couple to flagpole extension 200 via anti-rotation aperture 222. Light unit arm 246 may couple to light unit 260 via the plurality of bracket mounting apertures 224. When coupled to an angled flagpole, second bracket 240 may position light unit 260 directly over flag 920 at a height that illuminates the entirety of flag 920. Second bracket 240 may orient light unit 260 such that solar panel 264 is parallel to the ground for optimum sun exposure throughout the day.

The anti-rotation aperture 222 may comprise a circular center aperture 252 and two or more radial cutouts 254. Circular center aperture 252 may enable externally threaded ornament shaft 912 of ornamental top 910 to pass through bracket 220. The two or more radial cutouts 254 may engage the two or more anti-rotation projections 208 located on flagpole extension 200.

In a preferred embodiment, the two or more radial cutouts 254 may comprise two radial cutouts.

In use, light unit 260 may be coupled to distal end 292 of bracket 220 using mounting hardware 214. Ornamental top 910 may be removed from non-vertical flagpole 900 by unscrewing ornamental top 910. First fastener 210 may be screwed onto externally threaded shaft 204 of flagpole extension 200 and externally threaded shaft 204 may be screwed into internally threaded flagpole aperture 902 located at distal end 292 of non-vertical flagpole 900. Anti-rotation aperture 222 of bracket 220 may be placed over the two or more anti-rotation projections 208 located at distal end 292 of flagpole extension 200 and bracket 220 may be rotated to align the two or more anti-rotation projections 208 with the two or more radial cutouts 254 of anti-rotation aperture 222. Second fastener 212 may be screwed onto externally threaded ornament shaft 912 of ornamental top 910 and externally threaded ornament shaft 912 may be screwed into internally threaded aperture 206 located on distal end 292 of flagpole extension 200. Second fastener 212 may be tightened against flagpole extension 200 to lock bracket 220 to flagpole extension 200. Bracket 220 and flagpole extension 200 may be rotated to position bracket 220 directly over non-vertical flagpole 900. First fastener 210 may be tightened against non-vertical flagpole 900 to lock flagpole extension 200 to non-vertical flagpole 900 and thereby prevent anti-rotation coupling 216 from disengaging. Light unit 260 may be turned on using ON/OFF switch 268 and may begin a repeating cycle of recharging the one or more rechargeable batteries 266 during daylight hours and illuminating flag 920 after dusk.

From the above description, it is manifest that various techniques can be used for implementing the concepts described in the present application without departing from the scope of those concepts. Moreover, while the concepts have been described with specific reference to certain embodiments, a person having ordinary skill in the art would recognize that changes can be made in form and detail without departing from the scope of those concepts. As such, the described embodiments are to be considered in all respects as illustrative and not restrictive. It should also be understood that the present application is not limited to the particular embodiments described above, but many rearrangements, modifications, and substitutions are possible without departing from the scope of the present disclosure.

What is claimed is:

1. A flagpole light mounting system comprising:

a flagpole extension, a light unit, and a bracket;

wherein the flagpole light mounting system detachably couples to a non-vertical flagpole configured to mount horizontally or at an oblique upward angle relative to a supporting structure to illuminate a flag being flown from the non-vertical flagpole from above;

wherein the flagpole extension is a cylindrical bar that lengthens the non-vertical flagpole and is inserted between the non-vertical flagpole and an ornamental top;

wherein a proximal end of the flagpole extension comprises an externally threaded shaft;

wherein the flagpole extension couples to the non-vertical flagpole by screwing the externally threaded shaft of the flagpole extension into an internally threaded flagpole aperture located at a distal end of the non-vertical flagpole;

wherein a distal end of the flagpole extension comprises an internally threaded aperture and two or more anti-rotation projections located adjacent to the internally threaded aperture extending axially towards the ornamental top;

wherein the ornamental top couples to the flagpole extension by screwing an externally threaded ornament shaft of the ornamental top into the internally threaded aperture of the flagpole extension;

wherein the top of the bracket couples to the light unit;

wherein the bottom of the bracket couples to the flagpole extension via an anti-rotation aperture located at the bottom of the bracket and the two or more anti-rotation projections engage the anti-rotation aperture in order to prevent the bracket from rotating around the flagpole extension;

wherein the shape of the bracket and the positioning of twin light sources located within the light unit cause both sides of the flag to be illuminated.

2. The flagpole light mounting system according to claim 1, wherein the two or more anti-rotation projections comprise two projections.

3. The flagpole light mounting system according to claim 1, wherein a first fastener and a second fastener are operable to further prevent rotation of the flagpole extension and the bracket;

wherein the first fastener threads onto the externally threaded shaft of the flagpole extension before coupling the flagpole extension to the non-vertical flagpole;

wherein the first fastener is rotated to tighten against the non-vertical flagpole to prevent the flagpole extension from rotating.

4. The flagpole light mounting system according to claim 3, wherein the first fastener is a locknut.

5. The flagpole light mounting system according to claim 3, wherein the second fastener threads onto the externally threaded ornament shaft of the ornamental top before coupling the ornamental top to the flagpole extension;

wherein the second fastener is rotated to tighten against the flagpole extension to assure that the anti-rotation aperture on the bracket remains engaged with the two or more anti-rotation projections on the flagpole extension.

6. The flagpole light mounting system according to claim 5, wherein the light unit illuminates the flag after dusk;

wherein the light unit is positioned above the flag and supported by the bracket;

wherein the intensity of the twin light sources, the size of the bracket, and the shape of the bracket cause the light unit to illuminate the entirety of the flag.

7. The flagpole light mounting system according to claim 6, wherein the twin light sources comprise a left light source that is positioned on the bottom left side of a light unit enclosure and a right light source that is positioned on the bottom right side of the light unit enclosure.

8. The flagpole light mounting system according to claim 7, wherein the left light source and the right light source are canted to point towards the center of the flag.

9. The flagpole light mounting system according to claim 7, wherein an individual light source selected from the left light source and the right light source comprise one or more light emitting diodes.

10. The flagpole light mounting system according to claim 9, wherein the light unit is solar-powered;

wherein a solar panel located on the top of the light unit enclosure charges one or more rechargeable batteries during daylight hours;

wherein the one or more rechargeable batteries power the twin light sources between dusk and dawn;

wherein the one or more rechargeable batteries are accessible for servicing via a battery door;

wherein an ON/OFF switch accessible outside of the light unit enclosure interrupts the electrical circuit between the one or more rechargeable batteries and the twin light sources to prevent the twin light sources from drawing power from the one or more rechargeable batteries during periods of disuse.

11. The flagpole light mounting system according to claim 10, wherein the light unit enclosure comprises a mounting inset for accepting the distal end of the bracket;

wherein the bracket couples to the light unit by passing mounting hardware through a plurality of bracket mounting apertures in the bracket and into a plurality of enclosure mounting apertures located in the mounting inset.

12. The flagpole light mounting system according to claim 11, wherein the bracket is an armature that supports the light unit at a position above the flag such that the light unit is centered over the non-vertical flagpole and at a height that optimally illuminates both sides of the flag;

wherein the bracket is selected from a first bracket for use on horizontal flagpoles and a second bracket for use on obliquely-angled flagpoles.

13. The flagpole light mounting system according to claim 12, wherein the first bracket comprises a vertical arm and a horizontal arm;

wherein the angle formed by the vertical arm and the horizontal arm is a perpendicular angle;

wherein the vertical arm couples to the flagpole extension via the anti-rotation aperture;

wherein the horizontal arm couples to the light unit via the plurality of bracket mounting apertures;

wherein when coupled to a horizontal flagpole, the first bracket positions the light unit directly over the flag at a height that illuminates the entirety of the flag;

wherein the first bracket orients the light unit such that the solar panel is parallel to the ground for optimum sun exposure throughout the day.

14. The flagpole light mounting system according to claim 12, wherein the second bracket comprises a riser arm and a light unit arm;

wherein the angle formed by the riser arm and the light unit arm is an oblique angle;

wherein the riser arm couples to the flagpole extension via the anti-rotation aperture;

wherein the light unit arm couples to the light unit via the plurality of bracket mounting apertures;

wherein when coupled to an angled flagpole, the second bracket positions the light unit directly over the flag at a height that illuminates the entirety of the flag;

wherein the second bracket orients the light unit such that the solar panel is parallel to the ground for optimum sun exposure throughout the day.

15. The flagpole light mounting system according to claim 12, wherein the anti-rotation aperture comprises a circular center aperture and two or more radial cutouts;

wherein the circular center aperture enables the externally threaded ornament shaft of the ornamental top to pass through the bracket;

wherein the two or more radial cutouts engage the two or more anti-rotation projections located on the flagpole extension.

16. The flagpole light mounting system according to claim 15, wherein the two or more radial cutouts comprise two radial cutouts.

17. A flagpole light mounting system comprising:

a flagpole extension, a light unit, and a bracket;

wherein the flagpole light mounting system detachably couples to a non-vertical flagpole configured to mount horizontally or at an oblique upward angle relative to a supporting structure to illuminate a flag being flown from the non-vertical flagpole from above;

wherein the flagpole extension lengthens the non-vertical flagpole and is inserted between the non-vertical flagpole and an ornamental top;

wherein a proximal end of the flagpole extension comprises an externally threaded shaft;

wherein the flagpole extension couples to the non-vertical flagpole by screwing the externally threaded shaft of the flagpole extension into an internally threaded flagpole aperture located at a distal end of the non-vertical flagpole;

wherein a distal end of the flagpole extension comprises an internally threaded aperture and two or more anti-rotation projections located adjacent to the internally threaded aperture extending axially towards the ornamental top;

wherein the ornamental top couples to the flagpole extension by screwing an externally threaded ornament shaft of the ornamental top into the internally threaded aperture of the flagpole extension;

wherein the top of the bracket couples to the light unit;

wherein the bottom of the bracket couples to the flagpole extension via an anti-rotation aperture located at the bottom of the bracket and the two or more anti-rotation projections engage the anti-rotation aperture in order to prevent the bracket from rotating around the flagpole extension;

wherein the shape of the bracket and the positioning of twin light sources located within the light unit cause both sides of the flag to be illuminated.

18. A flagpole light mounting system comprising:

a flagpole extension, a light unit, and a bracket;

wherein the flagpole light mounting system detachably couples to a non-vertical flagpole configured to mount horizontally or at an oblique upward angle relative to a supporting structure to illuminate a flag being flown from the non-vertical flagpole from above;

wherein the flagpole extension lengthens the non-vertical flagpole and is inserted between the non-vertical flagpole and an ornamental top;

wherein the flagpole extension couples to the non-vertical flagpole;

wherein the ornamental top couples to the flagpole extension;

wherein the top of the bracket couples to the light unit;

wherein the bottom of the bracket couples to the flagpole extension via an anti-rotation aperture located at the bottom of the bracket and the two or more anti-rotation projections engage the anti-rotation aperture in order to prevent the bracket from rotating around the flagpole extension;

wherein the shape of the bracket and the positioning of twin light sources located within the light unit cause both sides of the flag to be illuminated.

* * * * *